March 10, 1970 G. E. HOLZ 3,500,068
PULSE GENERATING AND REGISTERING CIRCUIT HAVING MEANS FOR CONTROLLING THE TIMING OF REGISTERING A COUNT AND GENERATING A COUNT
Filed Jan. 3, 1967
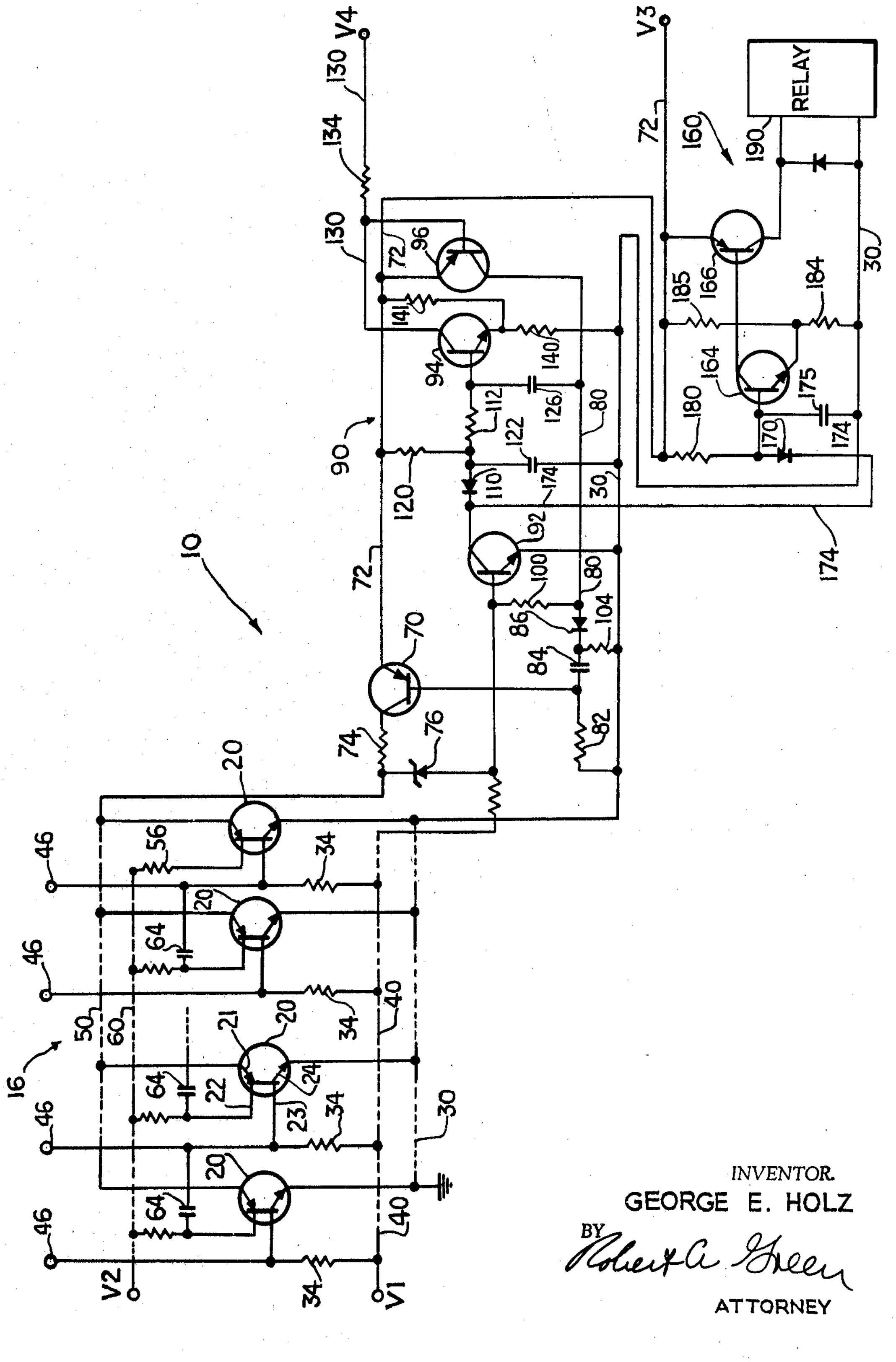
INVENTOR.
GEORGE E. HOLZ
BY Robert A. Green
ATTORNEY United States Patent Office 3,500,068
Patented Mar. 10, 1970

3,500,068

PULSE GENERATING AND REGISTERING CIRCUIT HAVING MEANS FOR CONTROLLING THE TIMING OF REGISTERING A COUNT AND GENERATING A COUNT

George E. Holz, North Plainfield, N.J., assignor to Burroughs Corporation, Detroit, Mich., a corporation of Michigan Filed Jan. 3, 1967, Ser. No. 606,709
Int. Cl. H03k *23/30, 21/36, 51/00*
U.S. Cl. 307—225 6 Claims

ABSTRACT OF THE DISCLOSURE

The circuit includes a series of semiconductor switching devices connected so that each can register a count and so that, as each turns off after registering a count, the next device in the series automatically turns on. The outputs of the switching devices are connected through a common output bus to a first circuit having a first time constant for registering a count in a counter, and to a second circuit having a second time constant and adapted to cause the switching devices to switch from one to the next after the first circuit has caused the counter to register a count.

This invention relates to controlled pulse generating circuits for selectively generating groups of pulses.

Many circuits are known in the prior art for controllably generating groups of pulses. However, with the advent of relatively sophisticated semiconductor devices, such as the four-electrode, dual transistor devices known as SCS devices, unique problems and requirements have been presented which are not solved by circuits in the prior art.

Briefly, a circuit embodying the invention includes a pulse register or pulse counter which comprises a series of SCS devices which are coupled together so that, as each is turned on to register a count or pulse and then is turned off, it automatically turns on the next device in the series. The SCS pulse register is coupled to a semiconductor oscillator circuit which is such that normally, when the SCS register is inactive and no SCS device is turned on, the semiconductor oscillator is held inoperative. When one of the SCS devices is then turned on, the oscillator is also turned on, and, as it turns on and off at some frequency, it causes the series of SCS devices in the register to turn on and off, in order, until the last device is turned off and the circuit is automatically disabled.

The circuit also embodies certain unique features relating to timing circuits and to the interrelationship of a mechanical relay and an electronic counting circuit.

The invention is described in greater detail by reference to the drawings wherein the single figure is a schematic circuit representation of the invention.

In the following description, devices such as diodes, transistors and the like which are well known are represented conventionally, and, for convenience, their electrodes are not given reference numerals.

The circuit of the invention 10 includes a pulse counter or register 16 which comprises a series of pulse counting or registering devices 20, each of which is a four-electrode semiconductor device known as an SCS device. Each SCS device functions, essentially, as a dual-triode latch and includes as its electrodes an anode 21, an anode gate 22, a cathode gate 23, and a cathode 24. In the register 16, ten SCS devices comprising ten counting or pulse registering positions are normally provided, but, for convenience, only the first two and last two are shown in detail in the drawing.

In the SCS devices 20, the cathode electrodes 24 are connected to a bus 30 which is connected to ground. The cathode gate electrodes 23 are connected (1) through a resistor 34 to a bus 40 which is connected to a small negative D.C. power source V1 and (2) to an input terminal 46 to which positive turn-on signals can be applied. Thus, any desired SCS device 20 can be turned on by applying an input pulse to its input terminal 46. The anode electrodes 21 of the SCS devices are connected to an anode bus 50, and the anode gates 22 are connected through a resistor 56 to a bus 60 which is connected to a positive D.C. power supply V2, and, in addition, each anode gate except that of the last SCS device in the series is coupled through a capacitor 64 to the cathode gate or input electrode 23 of the next adjacent leading device 20 in the series.

The circuit 10 also includes a control PNP transistor 70 in which the emitter electrode is connected through bus 72 to a positive D.C. power supply V3, and the collector electrode is connected through a resistor 74 to the anode bus 50, and through a Zener diode 76 to the cathode gate bias bus 40. The base electrode of the control transistor 70 is connected to a bus 80 which leads in one direction through a resistor 82 to the ground bus 30 and, in the other direction, through a capacitor 84 and diode 86 to the collector of a transistor 96.

The circuit 10 also includes an oscillator 90 which consists of transistors 92, 94, and 96 which are interconnected as follows. The transistor 92 is an NPN transistor and has its emitter connected to the ground bus 30, and its base connected (1) to the negative bias bus 40 and thus to the anode of diode 76 and (2) through resistor 100 to bus 80 so that it extends through lead 80 to the collector of transistor 96. The junction of capacitor 84 and diode 86 is also connected through a resistor 104 to ground or to some other suitable bias voltage. The collector of transistor 92 is connected through a diode 110 and resistor 112 to the base of NPN transistor 94, and the junction of diode 110 and resistor 112 is connected both through resistor 120 to bus 72, and through capacitor 122 to the ground bus 30. Resistor 120 and capacitor 122 provide the desired time constant for circuit 90, as will be described. The base of transistor 94 is also connected through a capacitor 126 to the bus 80 and thus to the collector of transistor 96. The collector of transistor 94 is coupled through a bus 130 and resistor 134 to a positive D.C. power source V4, and the emitter of transistor 94 is connected (1) through resistor 140 to ground bus 30 and (2) through resistor 141 to bus 72. Resistors 140 and 141 are used to set the desired bias voltage on the emitter of transistor 94.

Referring to transistor 96, its emitter is connected to bus 72, and its base is connected to bus 130 and thus to the collector of transistor 94, and its collector electrode is connected to bus 80, as already noted.

A utilization circuit 160 is also included in circuit 10 for recording or otherwise utilizing the pulse generating capabilities of the circuit. The circuit 160 includes NPN transistor 164 and PNP transistor 166. The base of transistor 166. The base of transistor 164 is coupled (1) through diode 170 and lead 174 to the collector of transistor 92, (2) through capacitor 175 to ground bus 30, and (3) through resistor 180 to bus 72. Capacitor 175 and resistor 180 provide the desired time constant for the utilization circuit 160, as will be described. The emitter of transistor 164 is coupled to the junction of resistors 184 and 185 which extends between buses 72 and 30 and sets the emitter bias, and the collector of transistor 164 is coupled to the base of transistor 166. In transistor 166, the emitter is connected to bus 172, and the collector is connected to a relay 190 or to some other suitable utilization device. For purposes of illustration, it is assumed that device 190 is a mechanical relay.

In operation of the circuit, initially, the SCS devices 20 are all off, transistor 70 is on, and transistor 92 is on.

Thus, capacitors 122 and 175 are discharged, and transistors 94 and 96 and transistors 164 and 166 are off. The entire circuit 10 is ready to perform a pulse-generating cycle. At the beginning of a cycle, one of the SCS devices 20 is turned on by the application of an input pulse at its input terminal 46, and a negative pulse appears on the anode bus 50. This negative pulse is coupled through diode 76 and lead 40 to the base of transistor 92 which is turned off. Now capacitors 122 and 175 begin to charge in a positive direction. The time constant established by resistor 180 and capacitor 175 is such that, after fifty milliseconds, the base of transistor 164 reaches a positive potential sufficient to turn on transistor 164, and, in turn, transistor 166 turns on and passes operating current to operate the relay 190. Transistors 164 and 166 and relay 190 remain on for fifty milliseconds.

The time constant of resistor 120 and capacitor 122 is such that, at the end of approximately one hundred milliseconds, the base of transistor 94 reaches turn-on potential due to charging of the capacitor 122. When transistor 94 turns on, transistor 96 turns on. The turning on of transistor 96 provides a positive pulse on bus 80 which is fed back to the base of transistor 94 and to the bases of transistors 70 and 92. This causes transistor 70 to turn off and interrupt the anode current in the on SCS device which is thus caused to turn off. The turning off of the on SCS device automatically causes the turning on of the next adjacent SCS device due to the coupling from the anode gate of each device through a capacitor 64 to the cathode gate of the adjacent device. At the same time, transistor 92 turns on and discharges capacitors 122 and 175 and resets the circuits 90 and 160 for the next cycle of operation. This next cycle is initiated by the turning on of the next SCS device and continues until the last SCS device is turned on and then off. The cycle ends when the last SCS device is turned off since it is not connected to any other device. As each SCS device is turned on, a pulse is registered in relay 190.

It can be seen that the number of pulses generated at the output relay 190 is determined by the SCS device selected to receive the input signal, and this number of pulses can be varied from one to ten by proper selection of the starting point in the SCS series.

The time constants are arranged so that circuit 160 and relay 190 go on after fifty milliseconds and stay on for fifty milliseconds, and circuit 90 operates to cause reset after one hundred milliseconds. This represents one typical and suitable arrangement. Of course, other arrangements could be used, if desired.

It is clear that modifications within the scope of the invention may be made in the specific circuit described above. For example, in addition to different time constants, other discharge devices than transistors could be used.

What is claimed is:

1. A pulse generating and registering circuit comprising a plurality of electronic counting devices connected in a counting series and interconnected so that when one turns off, the next turns on, each device having at least an input turn-on electrode, an output electrode, and a reference electrode, the output electrodes of said devices all being connected to a common output bus, the reference electrodes being connected to reference potential, a reference electrode of each device except the last being coupled to the input electrode of the next adjacent device in the series, a first switching device having an input electrode and an output electrode which is connected to said output bus, a second switching device having an output electrode and an input electrode which is connected to said output bus, said first and second switching devices being normally in one state, said second switching device being adapted to change state in response to a change in potential of said output bus which occurs when one of said electronic counting devices changes state as a result of a count-registering operation, said second switching device being connected through its output electrode and through a first timing circuit to first means for generating a signal and operating a first count-registering means, said second switching device also being connected through its output electrode and through a second timing circuit to second signal-generating means, said second timing circuit being adapted to operate said second signal-generating means at a time following the operation of said first count-registering means, said second signal-generating means being coupled to the input electrode of said first switching device and to the input electrode of said second switching device to change their states at the completion of a count-registering operation, the change in state of said first switching device producing a potential change through its output electrode on said output bus which causes one of said electronic counting devices which was ON to turn OFF and the adjacent device which was OFF to turn ON to initiate another count-registering cycle.

2. The circuit defined in claim 1 wherein said first count-registering means includes a mechanical counter and said second timing circuit has a longer time constant than said first timing circuit to insure that said mechanical counter operates before said second signal-generating circuit operates to recycle the circuit.

3. The circuit defined in claim 1 wherein each said electronic counting devices is a four-electrode semiconductor device and includes anode, anode gate, cathode, and cathode gate electrodes, each anode being connected to said output bus, each anode gate being connected to a source of reference potential and each but the last in the series being coupled to the cathode gate of the next adjacent device in the series, each cathode being connected to a source of reference potential.

4. A pluse generating and registering circuit comprising a plurality of electronic counting devices connected in a counting series and interconnected so that when one turns off, the next turns on, each device having at least an input turn-on electrode, an output electrode, and a reference electrode, the output electrodes of said devices all being connected to a common output bus, the reference electrodes being connected to reference potential, a reference electrode of each device except the last being coupled to the input electrode of the next adjacent device in the series, a first semiconductor switching device having an input electrode, an output electrode which is connected to said output bus, and a reference electrode which is connected to reference potential, a second semiconductor switching device having an output electrode, an input electrode which is connected to said output bus, and a reference electrode which is connected to reference potential, the output electrode of said second switching device being connected to a first resistor-capacitor circuit having a first time constant and to a second resistor-capacitor circuit having a second time constant, both of which are maintained in a discharged state when said second switching device is in a conductive state, and both of which charge up when said second switching device is in a non-conducting state.

said first resistor-capacitor circuit coupled to and controlling the operation of first means for generating a pulse and registering said pulse to represent a count, said second resistor-capacitor circuit being coupled to and controlling the operation of second pulse-generating means which is coupled to the input electrode of said first semiconductor switching device and to the input electrode of said second semiconductor switching device to change their states at the completion of a count-registering operation, the change in state of said first switching device producing a potential change through its output electrode on said output bus which causes one of said electronic counting devices which was ON to turn OFF and the adjacent device which was OFF to turn ON to initiate another count-registering cycle.

5. The circuit defined in claim 4 wherein each said electronic counting devices is a four-electrode semiconductor device and includes anode, anode gate, cathode, and cathode gate electrodes, each anode being connected to said output bus, each anode gate being connected to a source of reference potential and each but the last in the series being coupled to the cathode gate of the next adjacent device in the series, each cathode being connected to a source of reference potential.

6. The circuit defined in claim 4 wherein said resistor-capacitor circuits operate their associated pulse-generating circuits when they charge up to a selected level of potential.

References Cited

UNITED STATES PATENTS

| | | | |
|---|---|---|---|
| 2,404,047 | 7/1946 | Flory et al. | 328—48 X |
| 2,514,036 | 7/1950 | Dickinson | 328—59 X |
| 2,536,035 | 1/1951 | Cleeton | 328—59 |
| 3,299,313 | 1/1967 | Giacchi | 328—48 X |
| 3,389,270 | 6/1968 | Schoenfeld | 307—225 |

JOHN S. HEYMAN, Primary Examiner

STANLEY D. MILLER, Assistant Examiner

U.S. Cl. X.R.

307—224, 247, 260, 305; 317—148.5; 328—38, 48, 59